(12) United States Patent
Peters (10) Patent No.: US 11,059,415 B1
(45) Date of Patent: Jul. 13, 2021

(54) LOAD BINDER

(71) Applicant: Michael Frank Peters, Pouce Coupe (CA)

(72) Inventor: Michael Frank Peters, Pouce Coupe (CA)

(73) Assignee: Michael Frank Peters, Pouce Coupe (CA)

( * ) Notice: Subject to any disclaimer, the term of this patent is extended or adjusted under 35 U.S.C. 154(b) by 0 days.

(21) Appl. No.: 16/739,194

(22) Filed: Jan. 10, 2020

(51) Int. Cl.
B60P 7/08 (2006.01)

(52) U.S. Cl.
CPC .................. B60P 7/0838 (2013.01)

(58) Field of Classification Search
CPC ....... B60P 7/083; B60P 7/0853; B60P 7/0846; B60P 3/075; B60P 7/0823; B60P 7/0861; B60P 3/064; B60P 7/08
USPC ....... 410/103, 100, 12, 156, 7, 104, 116, 98, 410/96, 81, 80, 8, 77; 24/68 D, 69 T, 24/69 CT, 68 CT, 71 CT
See application file for complete search history.

(56) References Cited

U.S. PATENT DOCUMENTS

| | | | |
|---|---|---|---|
| 1,758,039 A | 5/1930 | Haubert | |
| 1,758,831 A | 5/1930 | Haubert | |
| 3,271,007 A | 9/1966 | Ratcliff | |
| 3,418,008 A * | 12/1968 | Durbin | B60P 7/0838 24/270 |
| 3,954,252 A | 5/1976 | Lyons | |
| 3,974,668 A | 8/1976 | McWhorter | |
| 4,238,940 A * | 12/1980 | McWhorter | F16G 15/00 70/14 |
| 4,683,728 A | 8/1987 | Hailey | |
| 4,693,097 A * | 9/1987 | Rivera | E05B 67/38 24/116 R |
| 6,141,836 A | 11/2000 | Thornton | |
| 7,913,363 B2 | 3/2011 | Scott | |
| 9,810,285 B2 * | 11/2017 | McNeilly | B60P 7/0807 |
| 9,884,581 B1 | 2/2018 | Royt | |

FOREIGN PATENT DOCUMENTS

CA 2930974 A1 5/2015

* cited by examiner

*Primary Examiner* — D Glenn Dayoan
*Assistant Examiner* — Sunsurraye Westbrook
(74) *Attorney, Agent, or Firm* — Stratford Managers Corporation (57) ABSTRACT

A load binder for securing a load for transport comprising a T-shaped handled connected to a first end of a lever arm, a primary hook connected to a first end of a U-shaped arm, the U-shaped arm and the lever arm connected via a first planar hinge mechanism at a second end of the U-shaped arm and a second end of the lever arm, a clip connected to the lever arm which aligns with the first end of the U-shaped arm while the U-shaped arm lies on top of the lever arm, a secondary arm and the lever arm connected via a second planar hinge mechanism to a first end of the secondary arm, an inner adjustment member connected to a second end of the secondary arm, an outer adjustment member which may be threaded into the inner adjustment member at a first end of the outer adjustment member and a secondary hook connected to the outer adjustment member at a second end of the outer adjustment member.

5 Claims, 7 Drawing Sheets

LOAD BINDER

FIELD OF INVENTION

The present disclosure relates to a load binder, more specifically but not by way of limitation, an adjustable load binder that provides sufficient leverage through a T-shaped handle and lever arm for securing a load for transport and prevents the application of a cheater bar or snipe.

BACKGROUND

Current load binders typically involve either a ratcheting system for tightening or a lever system. Employment of a ratchet binder for tightening multiple loads may be considered time consuming based on the nature of the ratcheting system and use during harsh weather conditions such as mud, ice and snow, can prolong this ever further, adding to a user's frustration. As well, reversing the pawl in the ratchet binder can sometimes jam the ratchet binder and the handle may get in the way when tightening. For a ball detent and spring mechanism, the accumulation of grit and grime may lead to extensive maintenance requirements. Furthermore, simple lever binders require substantial amounts of leverage to obtain a tight, secure grip which can only be achieved with the use of cheater bars. Cheater bars can be very dangerous to the user and may lead to serious injuries to the user, which is why they are frequently discourage under safe practice procedures.

U.S. Pat. No. 1,758,831 A (Haubert) discloses a lever binder which applies to hook ends connected to a lever component to bind chain, whereby the system secures a load in place. Shortcomings include a potential inability for the adjustment member to deliver a secure level of tension across the system without accompaniment of additional leverage.

U.S. Pat. No. 3,974,668 A (McWhorter) discloses a lever binder which includes a lock component connecting the lever arm and a hood end, which acts prevent theft of the cargo. Shortcomings include a potential inability for the adjustment member to deliver a secure level of tension across the system without accompaniment of additional leverage.

U.S. Pat. No. 7,913,363 B2 (Scott) discloses a lever binder which includes a threaded, adjustable member, which allows the user to manipulate the binding length. Shortcomings include a prolonged adjustment period, leading to an increase in time to completion and a potential inability for the adjustment member to deliver a secure level of tension across the system.

All documents cited herein are incorporated by reference.

There is a need for a load binder that doesn't require any additional attachments for obtaining necessary leverage, is safe, timely and effortless to apply, employ and maintain.

BRIEF SUMMARY

It is the object of the present invention to provide a load binder. In accordance with an aspect of the invention there is provided a load binder for securing a load for transport comprising a T-shaped handled connected to a first end of a lever arm, a primary hook connected to a first end of a U-shaped arm, the U-shaped arm and the lever arm connected via a first planar hinge mechanism at a second end of the U-shaped arm and a second end of the lever arm, a clip connected to the lever arm which aligns with the first end of the U-shaped arm while the U-shaped arm lies on top of the lever arm, a secondary arm and the lever arm connected via a second planar hinge mechanism to a first end of the secondary arm, an inner adjustment member connected to a second end of the secondary arm, an outer adjustment member which may be threaded into the inner adjustment member at a first end of the outer adjustment member and a secondary hook connected to the outer adjustment member at a second end of the outer adjustment member.

In accordance with an aspect of the invention, there is provided a load binder comprising a method of using the load binder to secure a load for transport, comprising attaching chain link to the primary hook and the secondary hook, threading the outer adjustment member into the inner adjustment member to increase tension across the load binder and the chain links and applying a force to the T-shaped handle thereby driving the U-shaped arm to lay on top of the lever arm and the clip to clasp and to lock the lever arm against the U-shaped arm.

In accordance with an embodiment of the invention, the primary hook may swivel around the second end of the U-shaped arm.

In accordance with an embodiment of the invention, the secondary hook may swivel around the second end of the outer adjustment member.

In accordance with an embodiment of the invention, the clip is a spring-loaded clip.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

Figure 1:
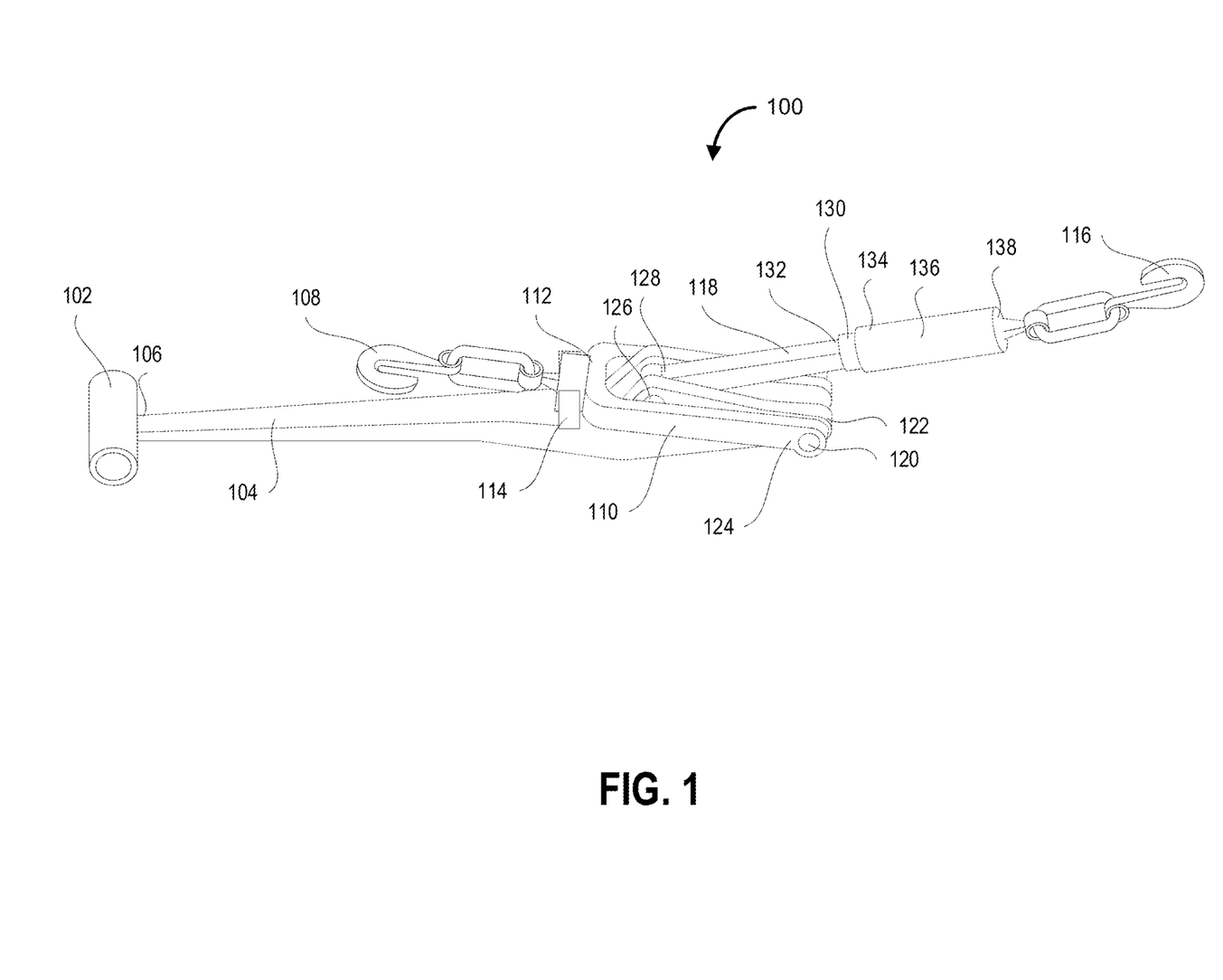
FIG. 1 illustrates an assembly 100 in accordance with one embodiment.

FIG. 1 depicts an assembly 100 of the load binder as in one embodiment. A T-shaped handle 102 is shown connected to a lever arm 104 at a first end of the lever arm 106, which provides additional length and sufficient leverage across the load binder without the need or ability to apply a cheater bar, snipe or any other potentially dangerous attachments for additional leverage. The T-shaped handle 102 is employed to provide the leverage necessary to achieve sufficient tension across the load binder hooked to chain links when securing a load. A primary hook 108 is connected to a U-shaped arm 110 at a first end of the U-shaped arm 112, where the connection allows for the primary hook 108 to swivel around the first end of the U-shaped arm 112, allowing for adjustment when attaching a chain link to the primary hook 108 during setup. A clip 114 is connected to the lever arm 104 which aligns with the first end of the U-shaped arm 112 while the U-shaped arm 110 lies on top of the lever arm 104. The clip 114 may be employed to secure the primary hook 108 against the lever arm 104 through applying a force to the T-shaped handle 102 thereby driving the U-shaped arm 110 to lie on top of lever arm 104 until the clip 114 clasps and locks the lever arm 104 against the U-shaped arm 110. This is typically done after chain link has secured the load in place and the chain link has been attached to the primary hook 108 and a secondary hook 116 during the setup. The U-shaped arm 110 is connected to the lever arm 104 via a first planar hinge mechanism 120 at a second end of the U-shaped arm 124 and a second end of the lever arm 122. The secondary arm 118 is connected to the lever arm 104 via a second planar hinge mechanism 126 to a first end of the secondary arm 128. An inner adjustment member 130 is connected to a second end of the secondary arm 132, which may be threaded into an outer adjustment member 136 at a first end of the outer adjustment member 134 to increase tension across the load binder and chain links. A secondary hook 116 is connected to a second end of the outer adjustment member 138, where the connection allows for the secondary hook 116 to swivel around the second end of the outer adjustment member 138 for adjustment when attaching to a chain link to the secondary hook 116 during setup. Examples for the clip 114 include, but are not limited to, a spring-loaded clip.

Figure 2:
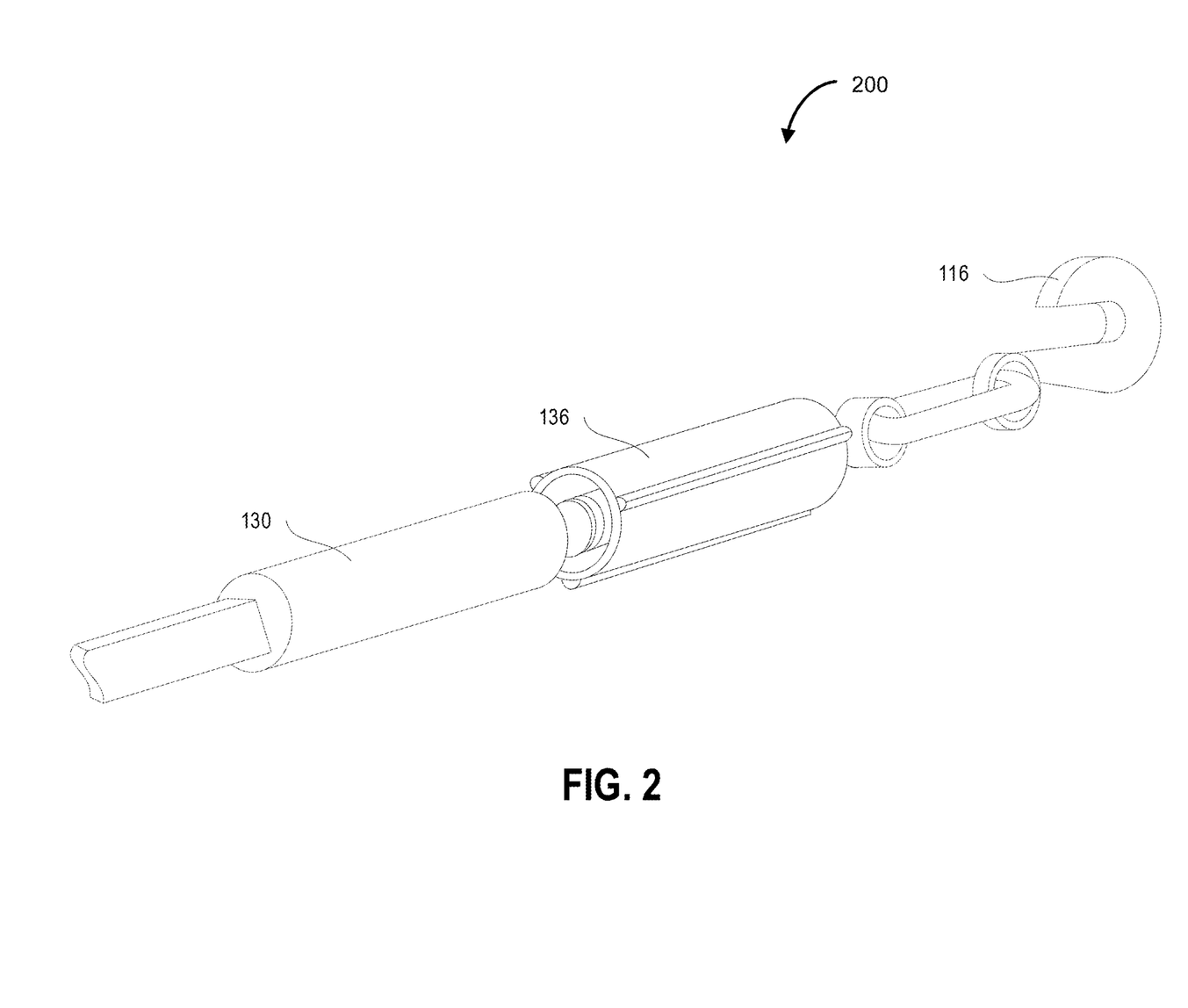
FIG. 2 illustrates a detached adjustable member 200 in accordance with one embodiment.

FIG. 2 depicts detached adjustable member 200 of the load binder as in one embodiment. The inner adjustment member 130 and outer adjustment member 136 are displayed separately, where the outer adjustment member 136 and secondary hook 116 are detached from the load binder.

Figure 3:
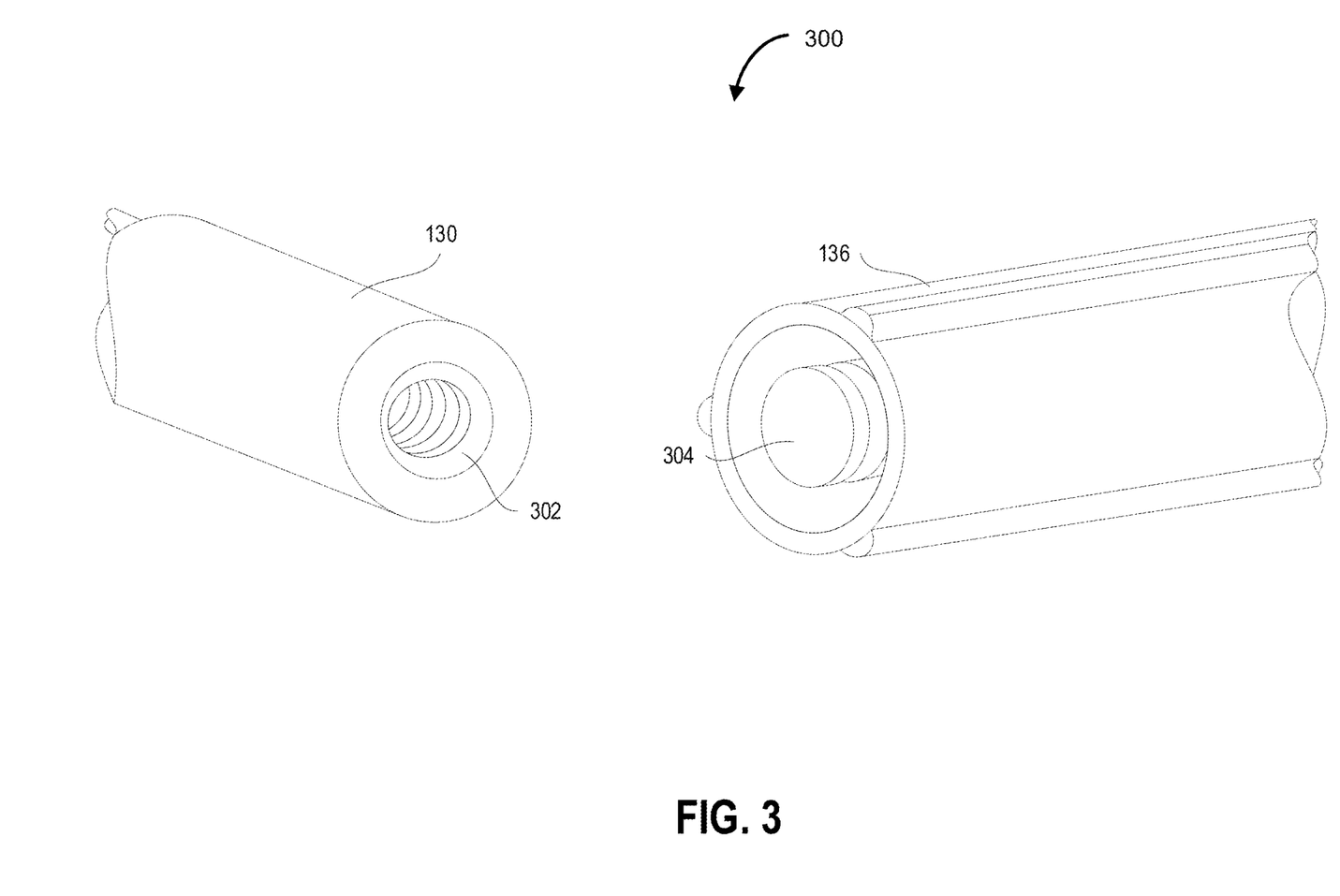
FIG. 3 illustrates a close up of adjustment members 300 in accordance with one embodiment.

FIG. 3 depicts a close up of adjustment members 300 of the load binder as in one embodiment. The inner adjustment member 130 is shown with a helical threaded track 302 along the inner surface and an accompanying outer adjustment member 136 with an internal cylindrical shaft 304 which contains helical threads on the outer surface. Threading the outer adjustment member 136 into the inner adjustment member 130 allows for adjusting the length between the primary hook 108 and secondary hook 116 which can be performed during the load binder setup and while the load binder is employed to secure a load. The outer adjustment member 136 may consist of ridges or edges for additional grip while adjusting. The internal attachment of the inner adjustment member 130 and the outer adjustment member 136 shields the threaded components from degradation catalyzed by harsh weather conditions.

Figure 4:
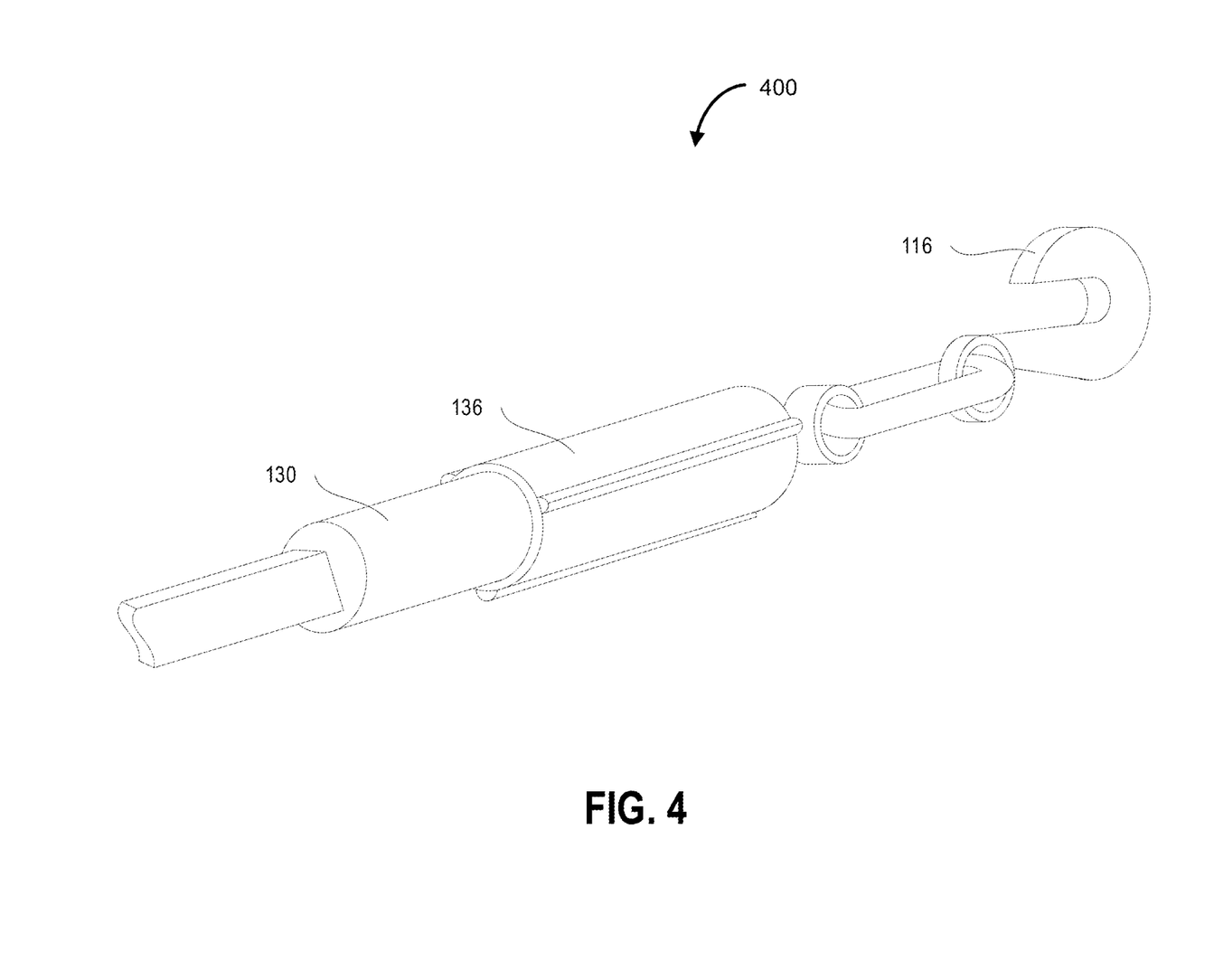
FIG. 4 illustrates an attached adjustment member fully extended 400 in accordance with one embodiment.

FIG. 4 depicts attached adjustment member fully extended 400 of the load binder as in one embodiment. The inner adjustment member 130 and outer adjustment member 136 are displayed connected where the largest possible distance between the primary hook 108 and secondary hook 116 exists.

Figure 5:
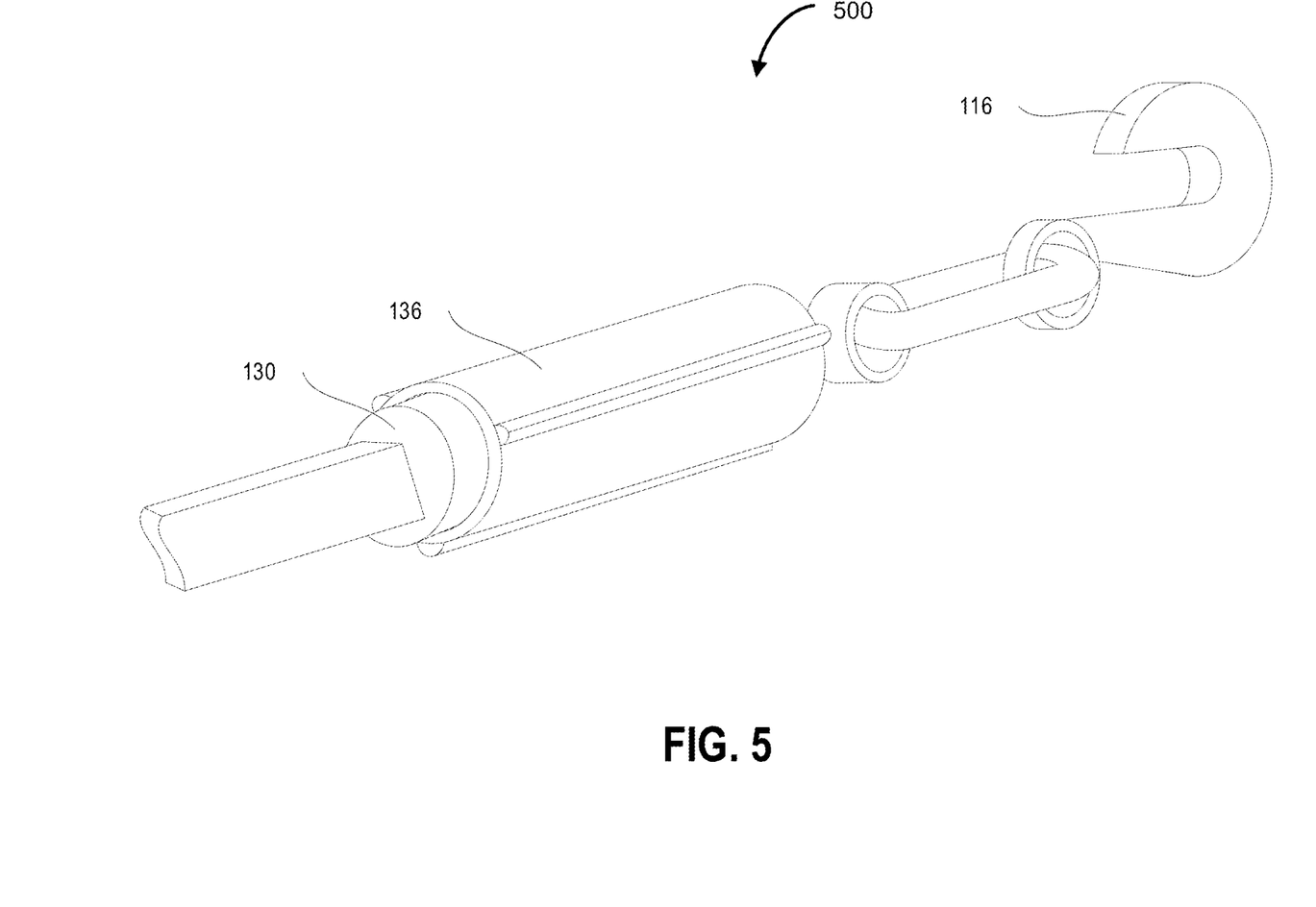
FIG. 5 illustrates an attached adjustment member fully retracted 500 in accordance with one embodiment.

FIG. 5 depicts attached adjustment member fully retracted 500 of the load binder as in one embodiment. The inner adjustment member 130 and outer adjustment member 136 are displayed connected where the shortest possible distance between the primary hook 108 and secondary hook 116 exists.

Figure 6:
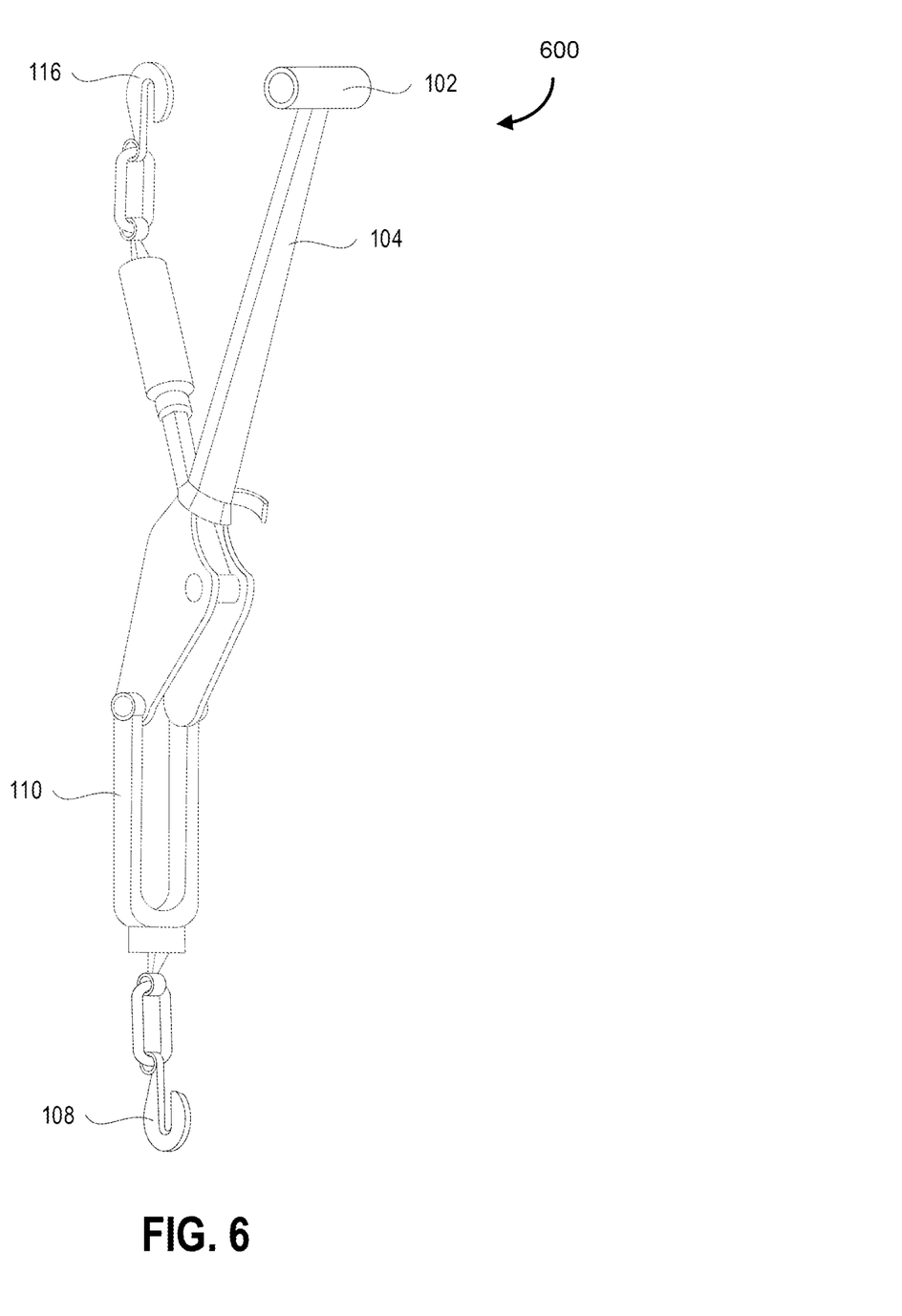
FIG. 6 illustrates an open position 600 in accordance with one embodiment.

FIG. 6 depicts an open position 600 of the load binder as in one embodiment. This example displays a vertical employment of the load binder during the setup of securing a load using the load binder. The primary hook 108 and the secondary hook 116 are displayed separated at opposite vertical ends with the T-shaped handle 102 and lever arm 104 fully retracted from the U-shaped arm 110. The primary hook 108 and the secondary hook 116 may be set with chain links employed in securing a load. The inner adjustment member 130 and outer adjustment member 136 can be further adjusted enabling timely and effortless setup of the load binder.

Figure 7:
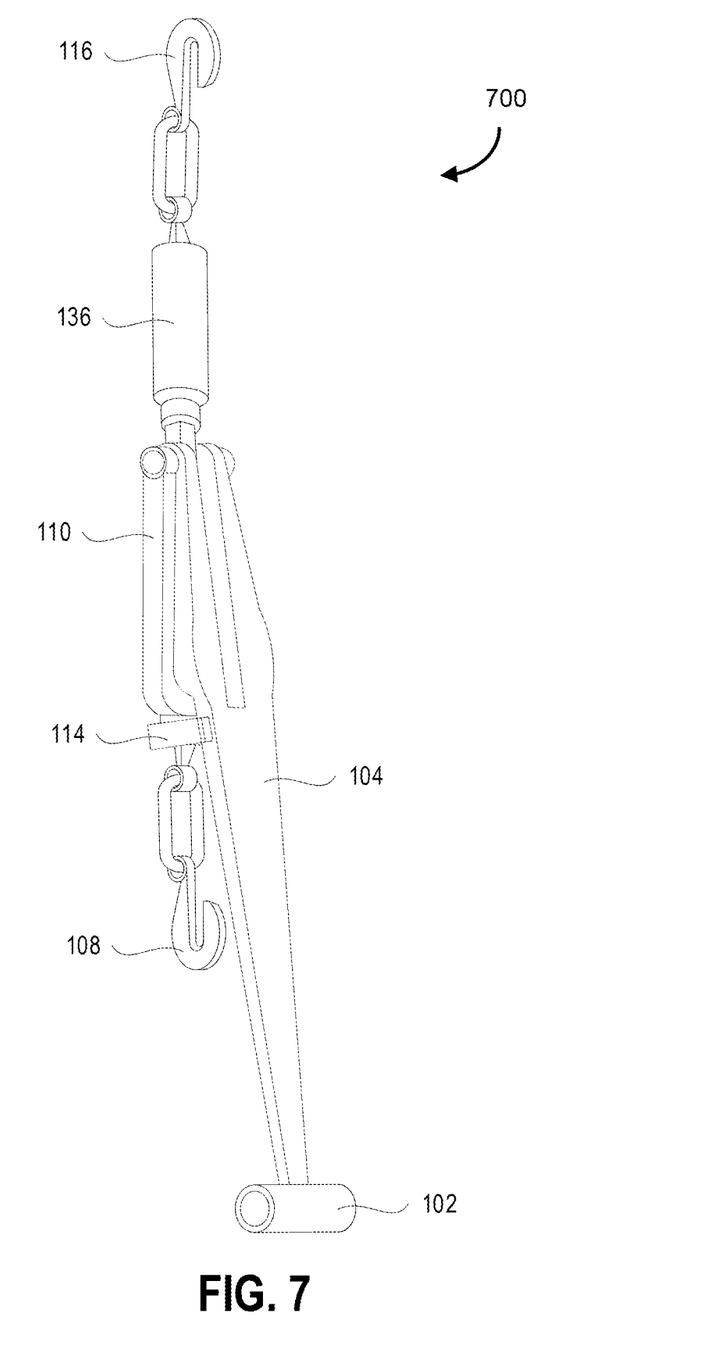
FIG. 7 illustrates a closed position 700 in accordance with one embodiment.

FIG. 7 depicts a closed position 700 of the load binder as in one embodiment. This example displays a vertical employment of the load binder during the utilization of the load binder for securing a load. Once the chain links have been attached to the primary hook 108 and the secondary hook 116, a force is applied to the T-shaped handle 102 downward until the lever arm 104 is lies against the U-shaped arm 110 and the clip 114 clasps the primary hook 108, securing it in place. The inner adjustment member 130 and outer adjustment member 136 can be further adjusted enabling timely and effortless utilization of the load binder for securing a load.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A load binder for securing a load for transport comprising:
   a lever arm having a first and second end;
   a T-shaped handle connected to the first end of the lever arm;
   a U-shaped arm having a first and second end, the second end of the U-shaped arm connected to the second end of the lever arm via a first planar hinge mechanism, the U-shaped arm movable from an extended position to a retracted position;
   a primary hook connected to the first end of the U-shaped arm;
   a clip connected to said lever arm aligns with said first end of said U-shaped arm while said U-shaped arm is in the retracted position;
   a secondary arm having a first and second end, the first end of the secondary arm is connected to the lever arm between the first and second end of the lever arm, via a second planar hinge mechanism;
   an inner adjustment member having a first and second end and a threaded portion, the inner adjustment member connected at the first end to the second end of said secondary arm;
   an outer adjustment member having a first and second end and a threaded portion, the first end of the outer adjustment member threaded into the second end of the inner adjustment member; and a secondary hook connected to the second end of said outer adjustment member.

2. The load binder of claim 1, wherein said primary hook may swivel around said first end of said U-shaped arm.

3. The load binder of claim 1, wherein said secondary hook may swivel around said second end of said outer adjustment member.

4. The load binder of claim 1, wherein said clip is a spring-loaded clip.

5. A method of using the load binder of claim 1, to secure a load for transport, comprising:

attaching a first chain link to said primary hook and a second chain link to said secondary hook;

screwing the threaded portion of said outer adjustment member into the threaded portion of said inner adjustment member to increase tension across said load binder and said first and second chain links; and applying a force to said T-shaped handle thereby driving said U-shaped arm to the retracted position on top of said lever arm and the clip to clasp and to lock said lever arm against said U-shaped arm.

\* \* \* \* \*